G. GIBBS.
Wagon Brake.
No. 86,659. Patented Feb. 9, 1869.
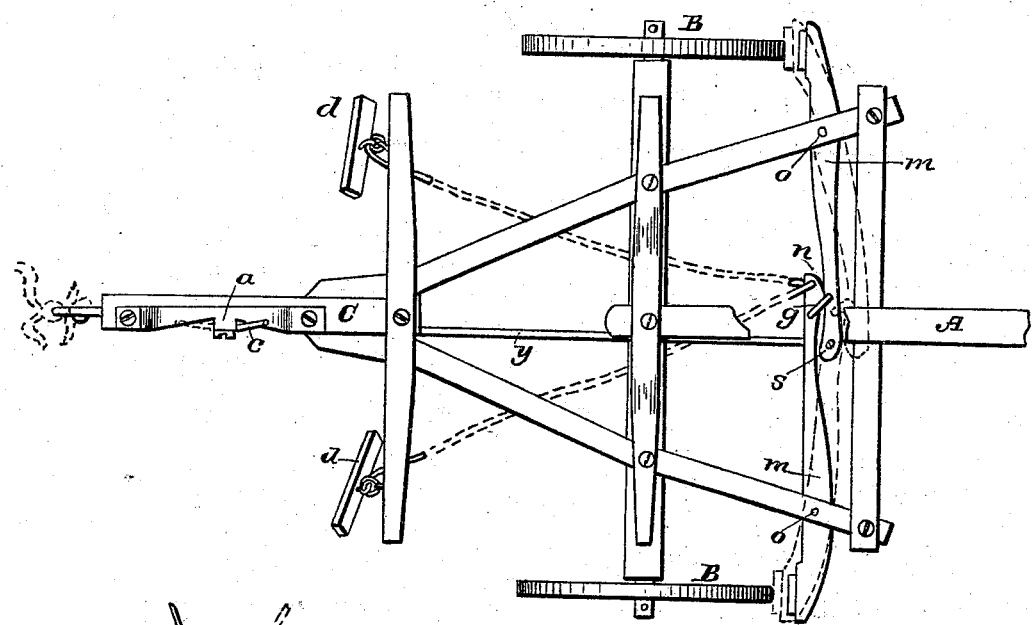
Witnesses:
J. Sowrey
M. Brown
Inventor:
Gilbert Gibbs
By A. M. Comsute & Bro.

GILBERT GIBBS, OF FAIRVIEW, INDIANA.

Letters Patent No. 86,659, dated February 9, 1869.

IMPROVED WAGON-BRAKE.

The Schedule referred to in these Letters Patent and making part of the same.

*To all whom it may concern:*

Be it known that I, GILBERT GIBBS, of Fairview, in the county of Switzerland, and State of Indiana, have invented new and useful Improvements in Wagon-Brakes; and I do hereby declare that the following is a full, clear, and exact description thereof, which will enable those skilled in the art to make and use the same, reference being had to the accompanying drawings, forming part of this specification.

This invention relates to that class of brakes which are so arranged that in coming down grades, the weight of the vehicle pressing on the horses, acts to press the brakes against the wheels.

The improvement consists in a lever and catch, so arranged that the vehicle may be backed at pleasure, when the said lever is properly placed, without operating the brakes, while the same lever may be used at any time for braking, as with ordinary brakes.

The stay-chains are also arranged so as to assist in releasing the brakes, when pulling, while in backing, they do not interfere in the operation.

Figure 1 is a plan.

Figure 2 is an elevation of the working-parts.

A is the coupling, broken away, to show the brakes;

B B are the fore wheels;

C, the tongue; and m m, the brakes. These brakes are pivoted to the hounds, in the form of levers, by the pins o o, and are connected at their inner ends by a link, g, or other similar device.

In the end of one of the brakes is the hole s, into which is inserted the rod y, which runs from thence, forward under the tongue C, through staples, and projects a short distance beyond the tongue, where it is formed into a ring, for the reception of the tongue or breast-chains, as shown.

On the tongue, near the whiffle-tree, is the catch-plate a, provided with two reverse notches or catches.

On the side of the tongue, at the centre of the plate a, is pivoted the lever c, the handle of the lever engaging with the notches in the said plate, and the lower end connecting with the rod y.

When the lever c is engaged with the rear catch, the vehicle may be backed at pleasure, the lever operating to prevent the bar y from being pressed back and locking the wheels.

When released from the notch, the pressure of the vehicle on the horses, in coming down a steep grade, through the pressure on the forward end of the rod y, will cause the brakes to come in contact with the wheels, thus locking them.

By pushing forward the lever into the front notch, as shown in fig. 2, the wheels may be locked at any time, and kept so, at pleasure.

The stay-chains are attached to the single-trees d d, and run from thence to the brakes, and are attached at n, instead of being attached to the whiffle-tree and axle, as in ordinary cases.

The object of this latter arrangement is to assist in releasing the brakes when the horses are drawing, and not interfering when they are backing, by reason of the slacking of the said chains.

All the reverse operations of the mechanism are clearly shown in red lines.

Having thus described my invention;

What I claim as new, and desire to secure by Letters Patent, is—

The manner of attaching the stay-chains, one end to the single-trees d d, and the other to the brakes m m, for the purpose and in the manner as set forth.

Witness my hand, this 7th day of July, 1868.

his
    GILBERT × GIBBS.
        mark.

Witnesses:
 H. CONNETT, Jr.,
 J. TIFFTS.